US012610032B2

(12) United States Patent　　　(10) Patent No.:　US 12,610,032 B2
Sakita　　　　　　　　　　　　　　(45) Date of Patent:　　Apr. 21, 2026

(54) STEREO CAMERA APPARATUS AND METHOD FOR GENERATING A PARALLAX IMAGE FROM LOW SENSITIVITY AND HIGH SENSITIVITY SUB-PIXEL ARRAY

(71) Applicant: Hitachi Astemo, Ltd., Ibaraki (JP)

(72) Inventor: Koichi Sakita, Tokyo (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 18/847,776

(22) PCT Filed: May 11, 2023

(86) PCT No.: PCT/JP2023/017652
§ 371 (c)(1),
(2) Date: Sep. 17, 2024

(87) PCT Pub. No.: WO2023/238589
PCT Pub. Date: Dec. 14, 2023

(65) Prior Publication Data
US 2025/0203055 A1　　Jun. 19, 2025

(30) Foreign Application Priority Data

Jun. 10, 2022　　(JP) ................................. 2022-094228

(51) Int. Cl.
H04N 13/156　　　(2018.01)
H04N 13/204　　　(2018.01)
(Continued)

(52) U.S. Cl.
CPC ........... H04N 13/156 (2018.05); H04N 25/51 (2023.01); H04N 25/57 (2023.01); H04N 25/706 (2023.01); H04N 13/204 (2018.05)

(58) Field of Classification Search
CPC ...... H04N 13/156; H04N 25/51; H04N 25/57; H04N 25/706; H04N 13/204;
(Continued)

(56) References Cited

U.S. PATENT DOCUMENTS 9,661,306 B2 * 5/2017 Hirota .................. H04N 13/257
10,212,356 B1 * 2/2019 Lerner ..................... H04N 5/04
(Continued)

FOREIGN PATENT DOCUMENTS

JP　　　2004-320147 A　　11/2001
JP　　　2010-135984 A　　　6/2010

OTHER PUBLICATIONS

S. Iida, et al., "A 0.68e-rms Random-Noise 121dB Dynamic-Range Sub-pixel architecture CMOS Image Sensor with LED Flicker Mitigation", IEDM 2018.

(Continued)

*Primary Examiner* — Susan E. Hodges
(74) *Attorney, Agent, or Firm* — MATTINGLY & MALUR, PC

(57)　　　　　　　ABSTRACT

An imaging apparatus has a plurality of cameras, each including: an imaging device in which unit pixels are periodically arranged, the unit pixels including high sensitivity sub-pixels that output a first output value for a certain exposure amount and low sensitivity sub-pixels that output a second output value lower than the first output value for a certain exposure amount; a composition section that selects and outputs an output of the high sensitivity sub-pixels and an output of the low sensitivity sub-pixels when the exposure amount is smaller or larger than the predetermined exposure value, respectively; and an amplification section that amplifies and outputs an output of the composition section, and so that image signals of the high and low sensitivity sub-pixels in the same predetermined exposure
(Continued)

(a) BEFORE COMPOSITION　⟹　(b) AFTER COMPOSITION　⟹　(c) AFTER COMPRESSION

OUTPUT — SATURATED OUTPUT — HIGH SENSITIVITY SUB-PIXEL 11a — COMPOSITE POINT — LOW SENSITIVITY SUB-PIXEL 11b — EXPOSURE AMOUNT — DYNAMIC RANGE BEFORE COMPOSITION

OUTPUT — COMPOSED OUTPUT — GAIN ADJUSTMENT — COMPOSITE POINT — EXPOSURE AMOUNT — DYNAMIC RANGE AFTER COMPOSITION

OUTPUT — SATURATED OUTPUT — COMPOSED OUTPUT — COMPRESSION — EXPOSURE AMOUNT values become the same between the plurality of cameras, corrects the image signals of the high and low sensitivity sub-pixels.

10 Claims, 9 Drawing Sheets

(51) Int. Cl.
*H04N 25/51* (2023.01)
*H04N 25/57* (2023.01)
*H04N 25/706* (2023.01)

(58) Field of Classification Search
CPC ......... H04N 13/133; H04N 2013/0081; H04N 13/239; H04N 23/45; H04N 23/90; H04N 25/585; G03B 7/097; G03B 35/08
USPC ......................................................... 348/47
See application file for complete search history.

(56) References Cited

U.S. PATENT DOCUMENTS

| | | | | |
|---|---|---|---|---|
| 11,710,291 B2 * | 7/2023 | Okuike | .................. | H04N 25/42 |
| | | | | 348/222.1 |
| 2009/0066816 A1 * | 3/2009 | Wakagi | .................. | H04N 23/82 |
| | | | | 348/E9.053 |
| 2017/0104942 A1 * | 4/2017 | Hirota | ................ | H10F 39/8033 |
| 2021/0389176 A1 * | 12/2021 | Yamazaki | ................ | G01J 1/44 |
| 2023/0124606 A1 * | 4/2023 | Yahata | ................ | G06V 10/751 |
| | | | | 382/274 |

OTHER PUBLICATIONS

International Search Report of PCT/JP2023/017652 dated Jul. 25, 2023.

* cited by examiner (b) PIXEL STRUCTURE OF IMAGING DEVICE IN FIRST EMBODIMENT (a) PIXEL STRUCTURE OF IMAGING DEVICE IN THE PAST

FIG. 4

(a) BEFORE COMPOSITION (b) AFTER COMPOSITION (c) AFTER SENSITIVITY CORRECTION

STEREO CAMERA APPARATUS AND METHOD FOR GENERATING A PARALLAX IMAGE FROM LOW SENSITIVITY AND HIGH SENSITIVITY SUB-PIXEL ARRAY

TECHNICAL FIELD

The present invention relates to an imaging apparatus and an imaging method, which are each capable of composing imaging signals having different exposure amounts or sensitivities to expand a dynamic range.

BACKGROUND ART

A stereo camera is known as a type of device to measure a distance to an object. The stereo camera is a device that measures the distance to an object based on trigonometry, using a difference in position (parallax) between object images in images captured by a plurality of cameras disposed at different positions. The stereo camera is installed in a vehicle such as an automobile and used in on-vehicle sensing technology to detect location of an obstacle or the like around the vehicle. The on-vehicle sensing technology is used under various types of ambient light, such as light at a tunnel entrance or a tunnel exit, light of a stop lamp of a preceding vehicle at night, and light of an LED-type sign, and thus requires imaging characteristics with a wide dynamic range.

In the field of imaging devices, there is known a high dynamic range (hereinafter referred to as "HDR") technology, in which pixel signals from multiple imaging pixels are composed to expand a dynamic range of a captured image. For example, nonpatent literature 1 discloses a technique for acquiring an HDR image by composing signals from multiple subpixels with different sensitivities into one pixel signal. In the HDR composition of the nonpatent literature 1, a predetermined threshold (composite-point output value) is set for an output value of a high sensitivity sub-pixel, and when the output value of the high sensitivity sub-pixel is smaller than the composite-point output value, the output signal of the high sensitivity sub-pixel is selected, and when the output value is larger than the composite-point output value, an output signal of a low sensitivity sub-pixel is amplified to generate an HDR signal.

The maximum number of gradations of the generated HDR image signal is larger than the maximum number of gradations of the individual sub-pixel signals before composition, which prevents image calculation from being performed at a desired processing speed, or prevents image display on an image display device with a given maximum input gradation value. As a method for solving such a problem, therefore, it is known to perform nonlinear compression to obtain an appropriate maximum number of gradations.

CITATION LIST

Nonpatent Literature

Nonpatent Literature 1: IEDM 2018, A 0.68e-rms Random-Noise 121 dB Dynamic-Range Sub-pixel architecture CMOS Image Sensor with LED Flicker Mitigation

SUMMARY OF INVENTION

Technical Problem

In stereo cameras, parallax is calculated from positional differences of object images between images captured by multiple cameras as follows: A target object image (or part of the object image) is compared between the images, and if the object images match each other, a difference in a position of the object image (or part of the object image) between the images is determined on a pixel-by-pixel basis. Hence, the images of the object (or part thereof) captured by the multiple cameras must be the same except for pixel positions. Each camera therefore uses a lens with a uniform resolution characteristic, and is subjected to geometric correction to correct geometric distortion caused by the lens and to sensitivity correction to adjust sensitivity characteristics of imaging devices to be uniform.

In the HDR technology using sub-pixels with different sensitivities, however, a composite-point output value, at which sub-pixels with different sensitivities are switched to each other, deviates during sensitivity correction between the multiple cameras, which prevents sensitivity characteristics from being perfectly matched with each other between the multiple cameras, resulting in degradation in parallax performance.

An object of the invention is therefore to provide an imaging apparatus and an imaging method, which each can match sensitivity characteristics of all cameras with each other without causing mismatch in composite point between cameras, thus achieving good parallax performance.

Solution to Problem

To achieve the object, an imaging apparatus of the invention includes a plurality of cameras, each camera including an imaging device including unit pixels being periodically arranged, each unit pixel including a high sensitivity sub-pixel that outputs a first output value for a certain exposure amount, and a low sensitivity sub-pixel that outputs a second output value lower than the first output value for the certain exposure amount, a composition section that selects and outputs an output of the high sensitivity sub-pixel when the exposure amount is smaller than a predetermined exposure value, and selects and outputs an output of the low sensitivity sub-pixel when the exposure amount is larger than the predetermined exposure value, and an amplification section that amplifies the output of the composition section and outputs the amplified output, where the predetermined exposure value is identical between the plurality of cameras, and the amplification section corrects image signals from the high sensitivity sub-pixel and the low sensitivity sub-pixel to allow the image signals from the high sensitivity sub-pixel and the low sensitivity sub-pixel to be the same between the plurality of cameras at the identical predetermined exposure value.

Advantageous Effects of Invention

According to the imaging apparatus or the imaging method of the invention, it is possible to match sensitivity characteristics of all cameras with each other without causing mismatch in composite point between the cameras, and thus achieve good parallax performance.

BRIEF DESCRIPTION OF DRAWINGS

FIG. 4 includes graphs showing HDR composition and a sensitivity correction method by the imaging apparatus of the first embodiment.

DESCRIPTION OF EMBODIMENTS

Some embodiments of an imaging apparatus of the invention will be described below with reference to the drawings.

First Embodiment

Figure 3:
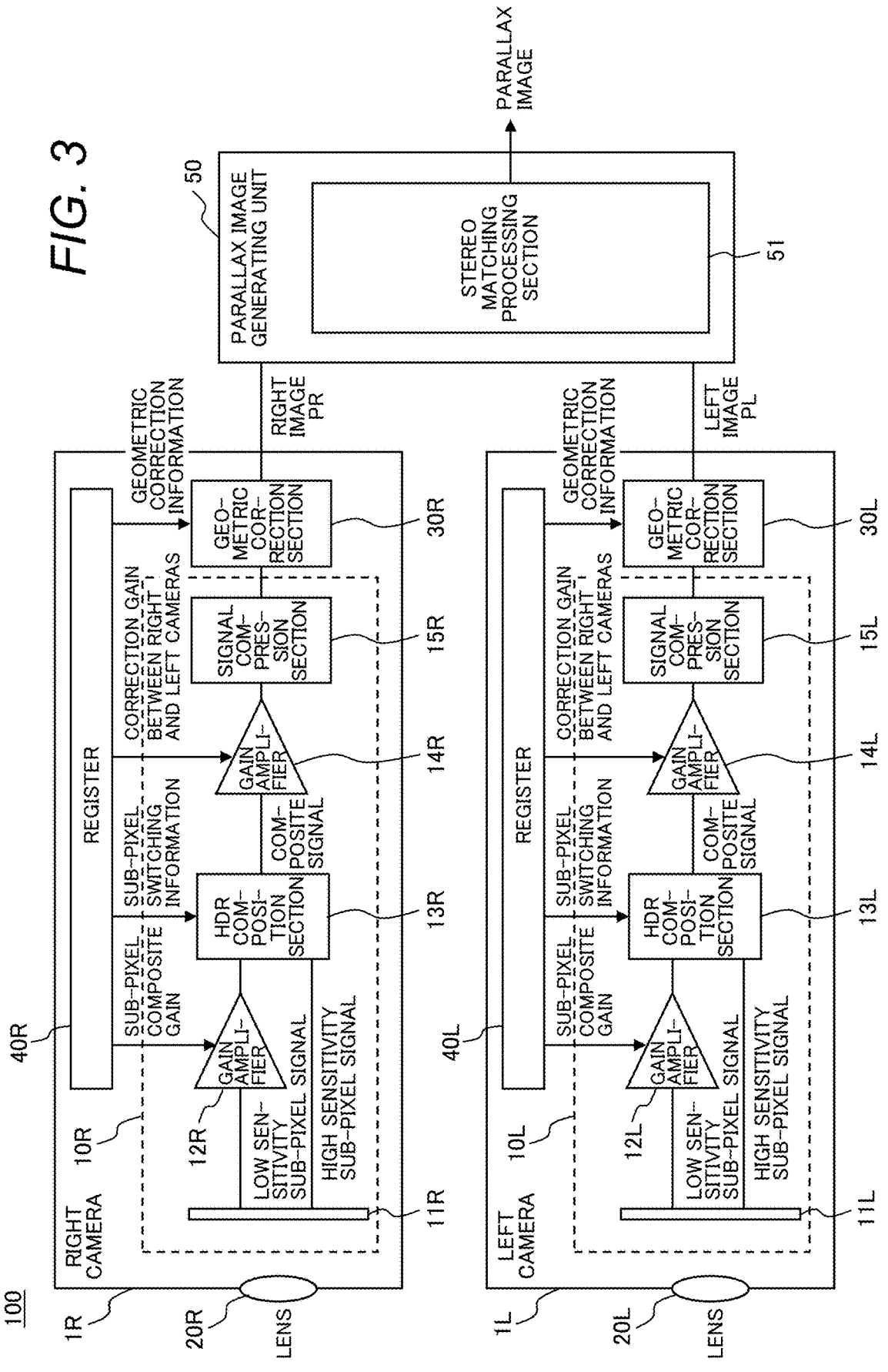
FIG. 3 shows a configuration of an imaging apparatus of the first embodiment.

An imaging apparatus 100 according to a first embodiment of the invention is now outlined with reference to FIG. 3. As shown in FIG. 3, the imaging apparatus 100 of this embodiment is a stereo camera that outputs a parallax image calculated based on a left image PL captured by a left camera 1L and a right image PR captured by a right camera 1R. Although reference numerals of components of a left camera 1L are each suffixed with L while reference numerals of components of a right camera 1R are each suffixed with R in FIG. 3, since functions of opposing components are essentially equivalent, unless otherwise required, details of this embodiment will be described below using generalized reference numerals with the suffixes L and R omitted.

Figure 1:
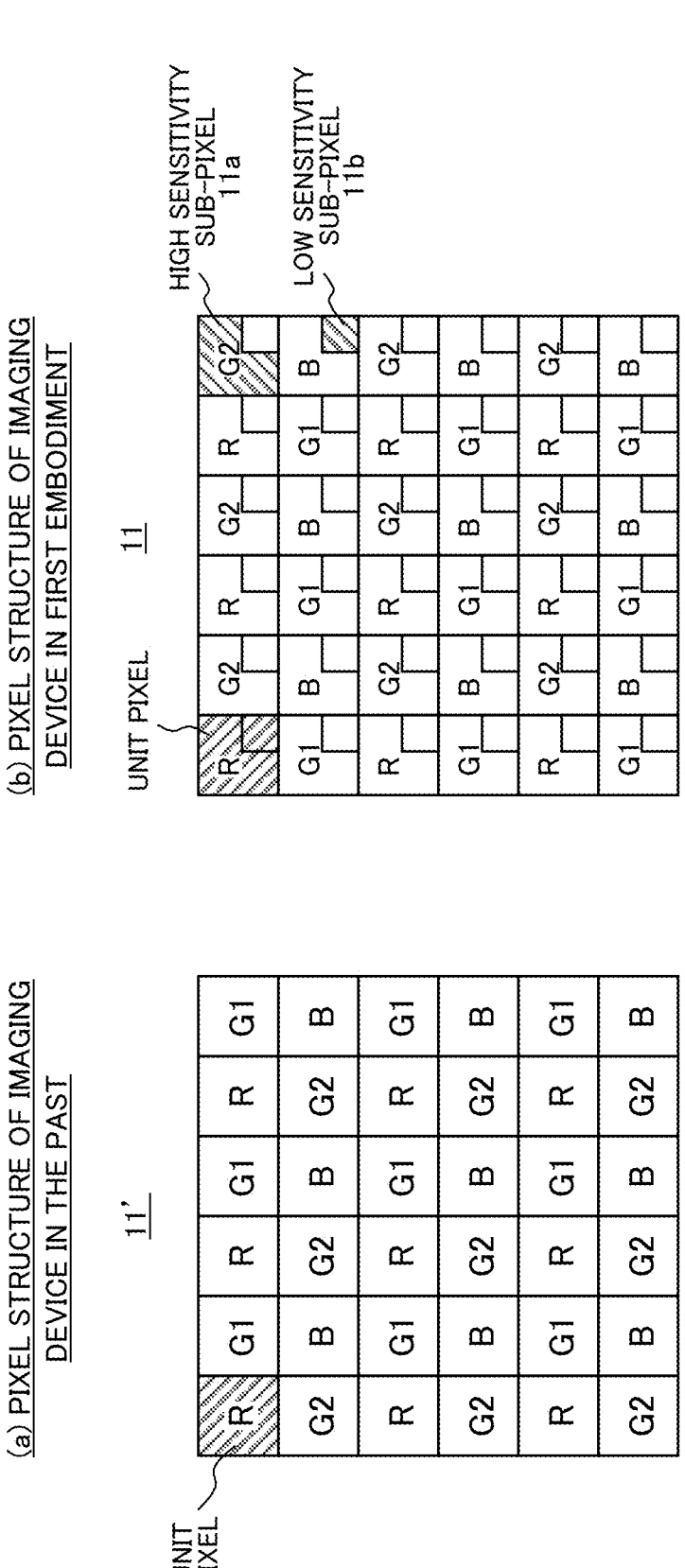
FIG. 1 includes schematic views of respective pixel structures of an imaging device in the past and an imaging device in a first embodiment.

A solid-state imaging device (hereinafter, referred to as "imaging device 11") such as a charge coupled device (CCD) or complementary metal oxide semiconductor (CMOS) is used for imaging by the left camera 1L or the right camera 1R. FIG. 1(*a*) is a schematic view of a pixel structure of an imaging device 11′ in the past, and FIG. 1(*b*) is a schematic view of a pixel structure of an imaging device 11 in this embodiment. In each imaging device, four unit pixels of red (R), green (G1, G2), and blue (B) are periodically arranged. In the imaging device 11 in this embodiment, however, each unit pixel includes two types of sub-pixels: a high sensitivity sub-pixel 11*a* having a large area, and a low sensitivity sub-pixel 11*b* having a small area. In the imaging apparatus 100 of this embodiment, therefore, HDR can be achieved by composing output signals from the two types of sub-pixels, i.e., the low sensitivity sub-pixel and the high sensitivity sub-pixel, into one output signal from the unit pixel.

Principle of HDR Composition

Figure 2:
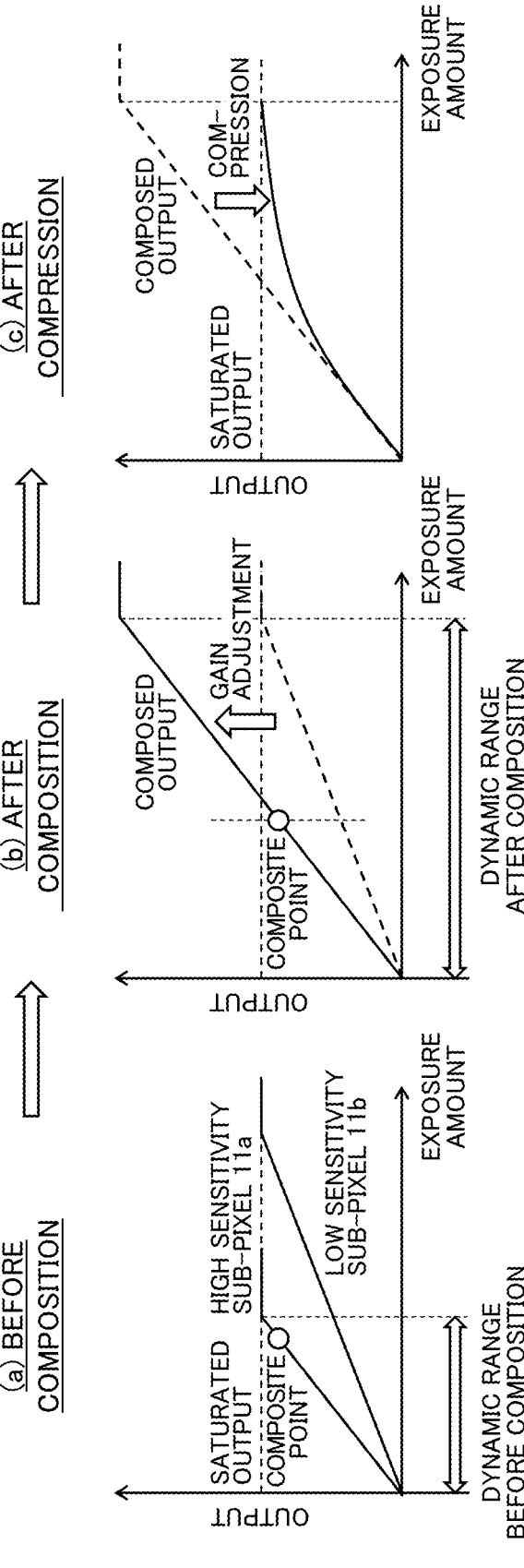
FIG. 2 includes graphs illustrating generation of an HDR pixel signal from signals from two sub-pixels having different sensitivities.

FIG. 2 includes graphs illustrating the principle of HDR composition of signals from the two types, high sensitivity and low sensitivity, of sub-pixels. The graphs of FIGS. 2(*a*) to 2(*c*) each show a sensitivity characteristic with the horizontal axis representing exposure amount and the vertical axis representing an output value of a pixel signal or sub-pixel signal.

As shown in FIG. 2(*a*), an output characteristic of a sub-pixel before composition shows a straight line with a steep slope for a high sensitivity sub-pixel 11*a* and a shallow slope for a low sensitivity sub-pixel 11*b*. The maximum output value (saturated output value) of the sub-pixel is determined by a characteristic of a photodiode or an AD converter in the imaging device 11. For example, a CMOS imaging device using a 12-bit AD converter has a saturated output value of 4095 gradations. In the HDR composition, a composite point is determined on a sensitivity line of the high sensitivity sub-pixel 11*a*, and a signal of the low sensitivity pixel is multiplied by a predetermined gain so that an output of the high sensitivity sub-pixel 11*a* and an output of the low sensitivity sub-pixel 11*b* form a smooth straight line. The reason why the composite point is provided on the sensitivity line of the high sensitivity sub-pixel 11*a*, and the gain is applied only to the low sensitivity pixel signal is because a gain value of larger than 1 is given to the sub-pixel signal in the subsequent stage. With the composite point as a boundary, subjects with smaller exposure amount to the left of the composite point are handled by the high sensitivity sub-pixel 11*a*, and subjects with larger exposure amount to the right of the composite point are handled by the low sensitivity sub-pixel 11*b*, which effectively expands a dynamic range of the imaging device 11.

In such a case, as shown in FIG. 2(*b*), the maximum number of gradations of the composed HDR image signal is larger than the maximum number of gradations of the individual sub-pixel signals before composition, which prevents image calculation at a desired processing speed, or prevents image display on an image display device with a fixed maximum input gradation value. As shown in FIG. 2(*c*), therefore, the composed output is nonlinearly compressed to an appropriate maximum number of gradations, and then used for subsequent processing (such as ranging processing).

Details of Imaging Apparatus 100

Referring again to FIG. 3, the imaging apparatus 100 according to this embodiment is now described in detail. As shown in FIG. 3, the imaging apparatus 100 includes a left camera 1L, a right camera 1R, and a parallax image generating unit 50. The left camera 1L includes an imaging unit 10L, a lens 20L, a geometric correction section 30L, and a register 40L. Similarly, the right camera 1R has an imaging unit 10R, a lens 20R, a geometric correction section 30R, and a register 40R. Details of each section are described in order below.

The parallax image generating unit 50 acquires a left image PL and a right image PR captured synchronously from the left camera 1L and the right camera 1R, generates a parallax image through stereo matching processing in a stereo matching section 51, and outputs the parallax image.

The imaging units 10 of the right and left cameras 1 each have an imaging device 11, a gain amplifier 12, a HDR composition section 13, a gain amplifier 14, and a signal compression section 15.

The imaging device 11 has a pixel structure including the high sensitivity sub-pixel 11*a* and the low sensitivity sub-pixel 11*b* (see FIG. 1(*b*)), and thus generates a high sensitivity sub-pixel signal Sa and a low sensitivity sub-pixel signal Sb for each unit pixel from a subject imaged on a light-receiving surface via the lens 20.

The HDR composition section 13 determines a level of the high sensitivity sub-pixel signal Sa for HDR composition as described with reference to FIG. 2. Specifically, when the level of the high sensitivity sub-pixel signal Sa is lower than that of a predetermined composite point (see FIG. 2(*a*)) given by the register 40, the HDR composition section 13 directly outputs the high sensitivity sub-pixel signal Sa as a composite signal. On the other hand, when the level of the high sensitivity sub-pixel signal Sa is higher than that of the composite point, the HDR composition section 13 outputs a signal, which is obtained by multiplying the low sensitivity sub-pixel signal Sb by a predetermined sub-pixel composite gain in the gain amplifier 12, as a composite signal (see FIG. 2(b)). The sub-pixel composite gain corresponds to a sensitivity ratio between the low sensitivity sub-pixel 11b and the high sensitivity sub-pixel 11a, and is registered in the register 40 in advance.

The composite signals as outputs of the HDR composition sections 13 of the right and left cameras are corrected by the respective gain amplifiers 14 of the cameras to correct a sensitivity difference between the right and left cameras. The correction gain value used herein is also registered in the register 40 in advance. The signal compression section 15 then performs signal compression to reduce the maximum number of gradations (see FIG. 2(c)).

The signals output from the right and left imaging units 10 are respectively input to the right and left geometric correction sections 30. In general, an individual camera has its own inherent distortion. There are various causes of such distortion, including misalignment between the imaging device 11 and a lens optical axis, and distortion of the lens 20. In triangulation with a stereo camera, it is important that the right and left images be aligned exactly parallel to each other in order to check the degree of matching between small image regions (matching blocks) in the right and left camera images. The geometric correction section 30 therefore uses geometric correction information provided by the register 40 to not only correct the distortion but also to parallelize the right and left images. The right and left image signals geometrically corrected by the geometric correction sections 30 are captured by the parallax image generating units 50, and parallax images are generated therein as described above.

Figure 4:
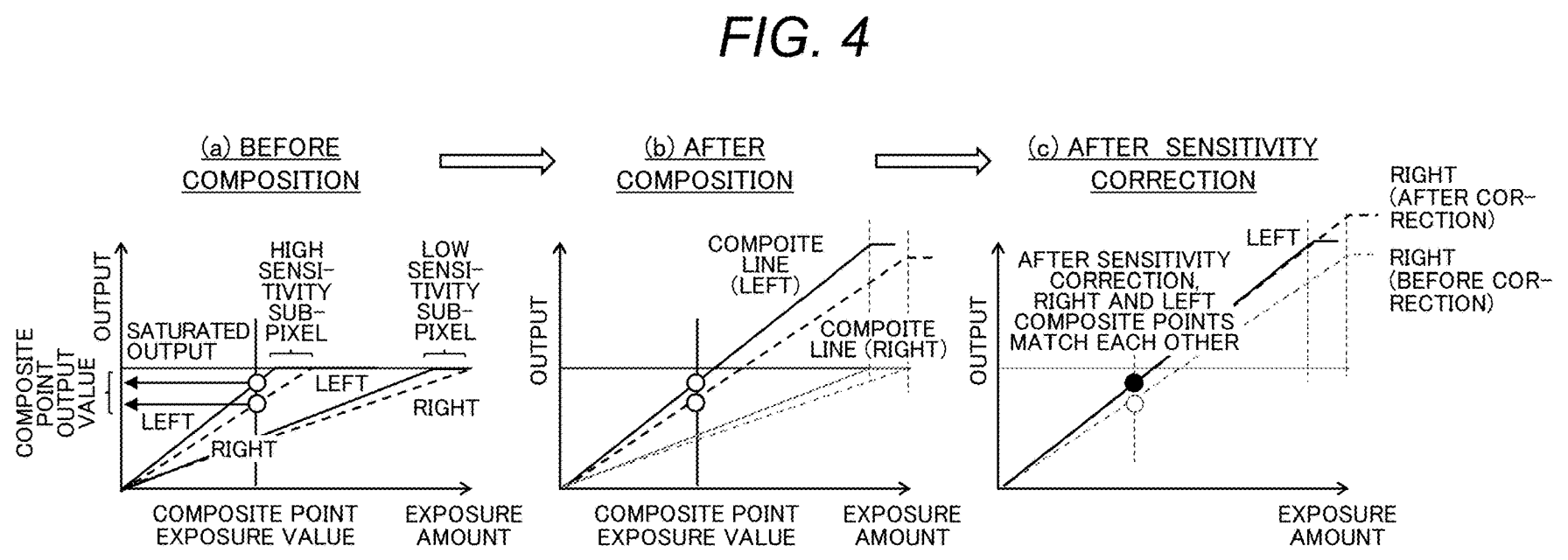

The HDR composition of the sub-pixel signals and sensitivity correction between the right and left cameras according to this embodiment are now described with reference to FIG. 4. The graphs of FIGS. 4(a) to 4(c) each show a sensitivity characteristic with the exposure amount on the horizontal axis and the output value of the pixel signal or the sub-pixel signal on the vertical axis, respectively showing (a) before composition of the high sensitivity and low sensitivity sub-pixel signals, (b) after composition thereof, and (c) after sensitivity correction between the right and left cameras.

FIG. 4(a) illustrates a case where a sub-pixel sensitivity characteristic of an imaging device 11L of the left camera 1L is higher than that of an imaging device 11R of the right camera 1R. As shown in FIG. 4(a), in this embodiment, the composite points of the high sensitivity and low sensitivity sub-pixels are first determined so that the right and left cameras have the same exposure amount. In this embodiment, since the composite-point output values are not the same between the right and left cameras 1R and 1L when the cameras have the same exposure amount, the composite-point output values are determined so as to differ by the difference in sensitivity between the right and left high sensitivity sub-pixels 11a.

In FIG. 4(b), showing a state after composition by the HDR composition section 13 of each camera, a mismatch in composite point between the right and left composite lines appears as a difference in output value corresponding to a difference between right and left sensitivities. In contrast, if sensitivity correction is performed on the composite line of the right camera 1R as shown in FIG. 4(c) showing a state after amplification by the gain amplifier 14R of the right camera 1R, not only the right and left sensitivity lines, but also the right and left composite points match each other. As a result, since types of sub-pixels selected by the right and left cameras are the same constantly, the parallax image generating unit 50 can generate an appropriate parallax image.

Figure 5:
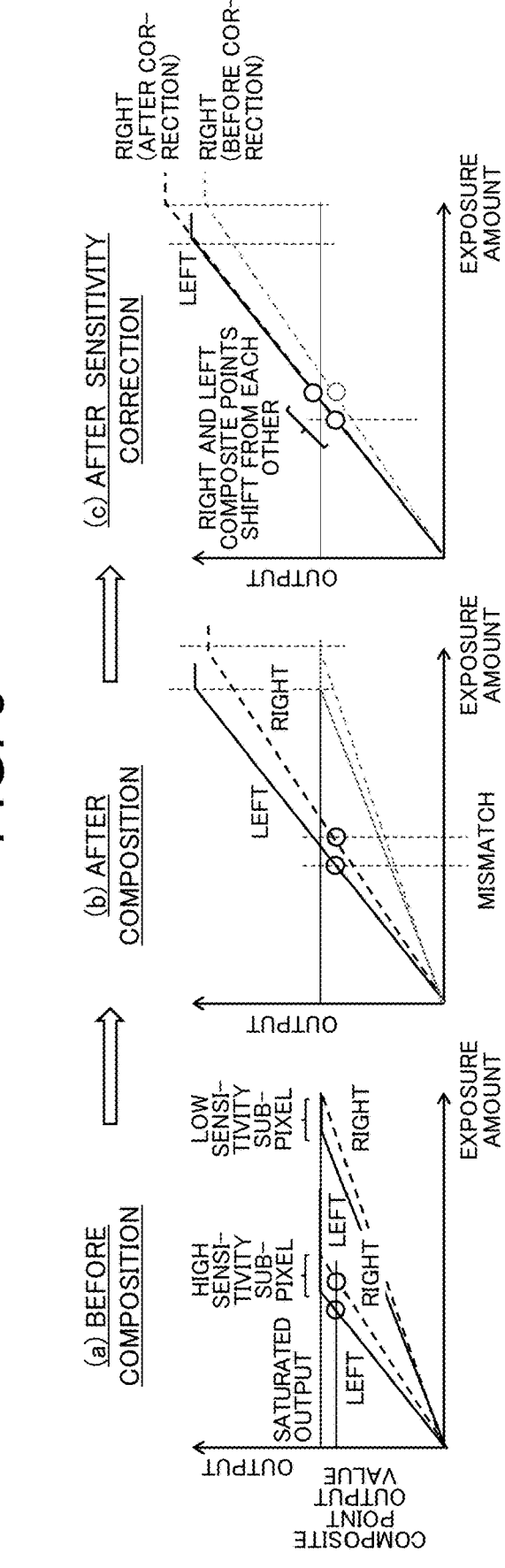
FIG. 5 includes graphs showing HDR composition and a sensitivity correction method by an imaging apparatus in the past.

An existing method for performing HDR composition of sub-pixel signals on an output basis is now described for comparison with reference to FIG. 5. As shown in FIG. 5(a), in the existing method, the composite point is determined so that the right and left cameras have the same output value rather than based on the exposure amount. In this case, as shown in FIG. 5(b) showing a state after composition, the difference in the composite point exposure value between the right and left composite lines appears as a difference in exposure amount. Even if sensitivity correction is performed on the line in FIG. 5(b) as shown in FIG. 5(c), although the right and left sensitivity lines match each other, the right and left composite points do not match. As a result, in the interval between the right and left composite points, since different types of sub-pixels are selected between the right and left cameras, the parallax image generation unit 50 probably generates a parallax image with lower accuracy.

Method for Registering Parameter in Register 40

Figure 6:
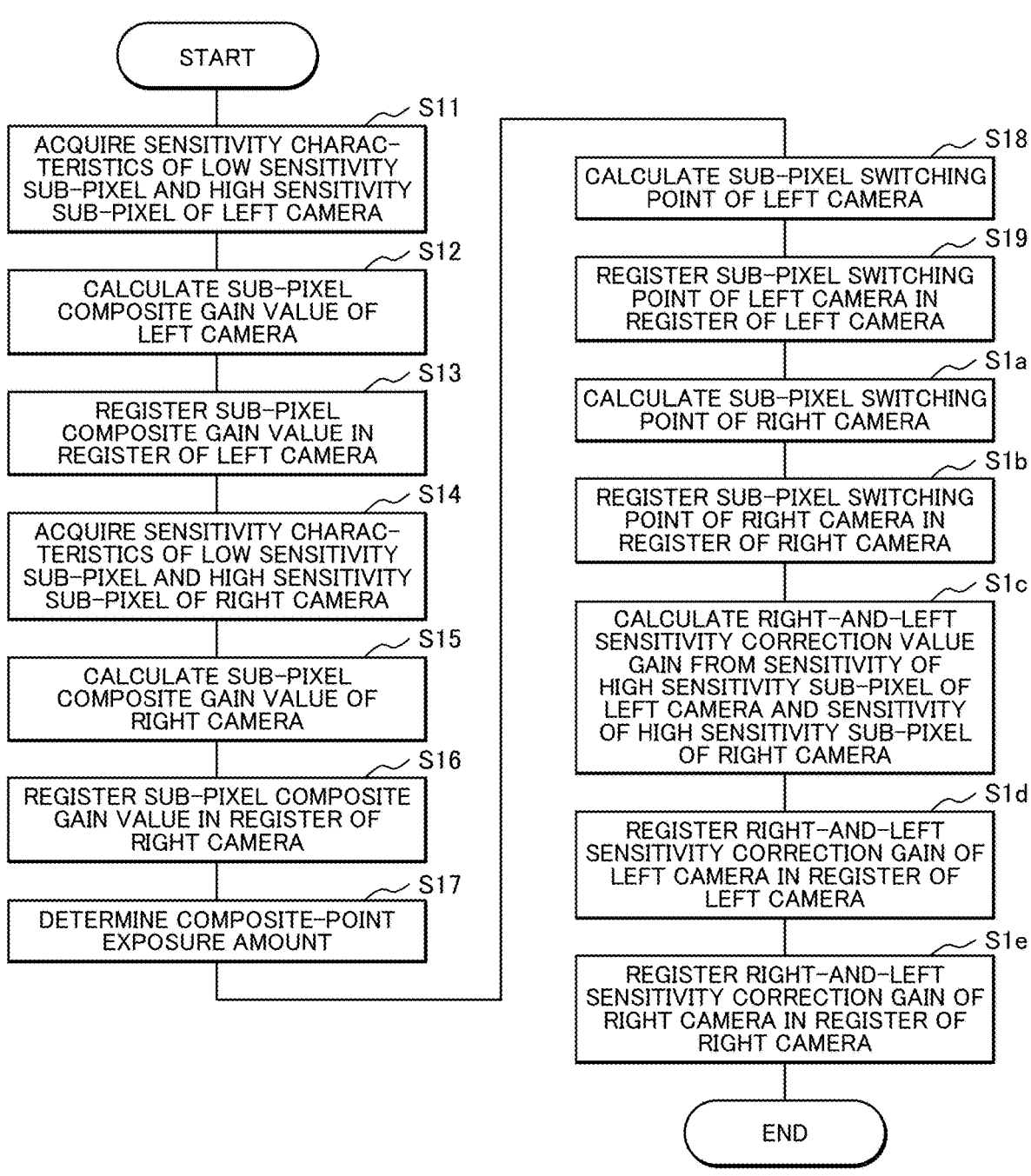
FIG. 6 is a flowchart of the HDR composition and sensitivity correction in the first embodiment.

A method for registering various parameters in the register 40 in this embodiment is now described with reference to a flowchart of FIG. 6. The operation subject of each step described below is a parameter registration operator or a parameter registration operation device.

First, the respective sensitivity characteristics of the low sensitivity and high sensitivity sub-pixels of the left camera 1L are acquired in step S11. To acquire the sensitivity characteristics, a white light source or the like is used while being strictly controlled in luminance value, and the exposure amount is changed by changing a shutter value of the camera to acquire a gradation value of the captured image. The respective sensitivity characteristics of the low sensitivity sub-pixel 11b and the high sensitivity sub-pixel 11a can be acquired from the changed exposure amount and the acquired gradation value.

Subsequently, in step S12, the gain value to compose the sub-pixels into one straight line is calculated from the sensitivity ratio of the low sensitivity sub-pixel 11b and the high sensitivity sub-pixel 11a.

In step S13, the parameter (composite gain value) calculated in step S12 is registered in the register 40L of the left camera 1L.

In steps S14 to S16, the same operations as in steps S11 to S13 are performed for the right camera 1R. The order of steps S11 to S13 and the order of steps S14 to S16 may be interchanged.

In step S17, the exposure amount for composing the sub-pixels is determined. Such an amount value may be determined in advance to a certain value before acquiring the above-mentioned sub-pixel sensitivity characteristics, or may be determined from the both sensitivity characteristics after acquiring right and left sub-pixel sensitivity characteristics.

In step S18, an output value, at which the sub-pixels are composed, is determined for the left camera 1L with respect to the composite-point exposure amount determined in step S17 (calculation of sub-pixel switching point).

In step S19, the parameter (sub-pixel switching point) determined in step S18 is registered in the register 40L of the left camera 1L.

In steps S1a and S1b, the same operations as in steps S18 and S19 are performed for the right camera 1R. The order of steps S18 and S19 and the order of steps S1a and S1b may be interchanged.

In step S1c, a sensitivity correction value gain is calculated to correct the sensitivity difference between the right and left cameras. This operation may be performed after acquiring the sensitivities of the right and left sub-pixels.

Finally, in steps S1d and S1e, the sensitivity correction gain calculated in step S1c is registered in the register 40 of each of the right and left cameras.

Although the above description has been given with two sub-pixel groups respectively having low sensitivity and high sensitivity, in case of sub-pixel groups respectively having low sensitivity, medium sensitivity, and high sensitivity, if the groups are divided into sub-pixel groups respectively having low sensitivity and medium sensitivity, and sub-pixel groups respectively having medium sensitivity and high sensitivity, the same principle applies to each group, and thus there is no limit to the number of sub-pixels.

According to the imaging apparatus of this embodiment as described above, the sensitivity characteristics of all cameras can be made the same without causing mismatch in composite point between cameras, making it possible to achieve good parallax performance.

Second Embodiment

An imaging apparatus 100 according to a second embodiment of the invention is described below with reference to FIG. 7. Duplicated description of points common to the first embodiment is omitted.

Figure 7:
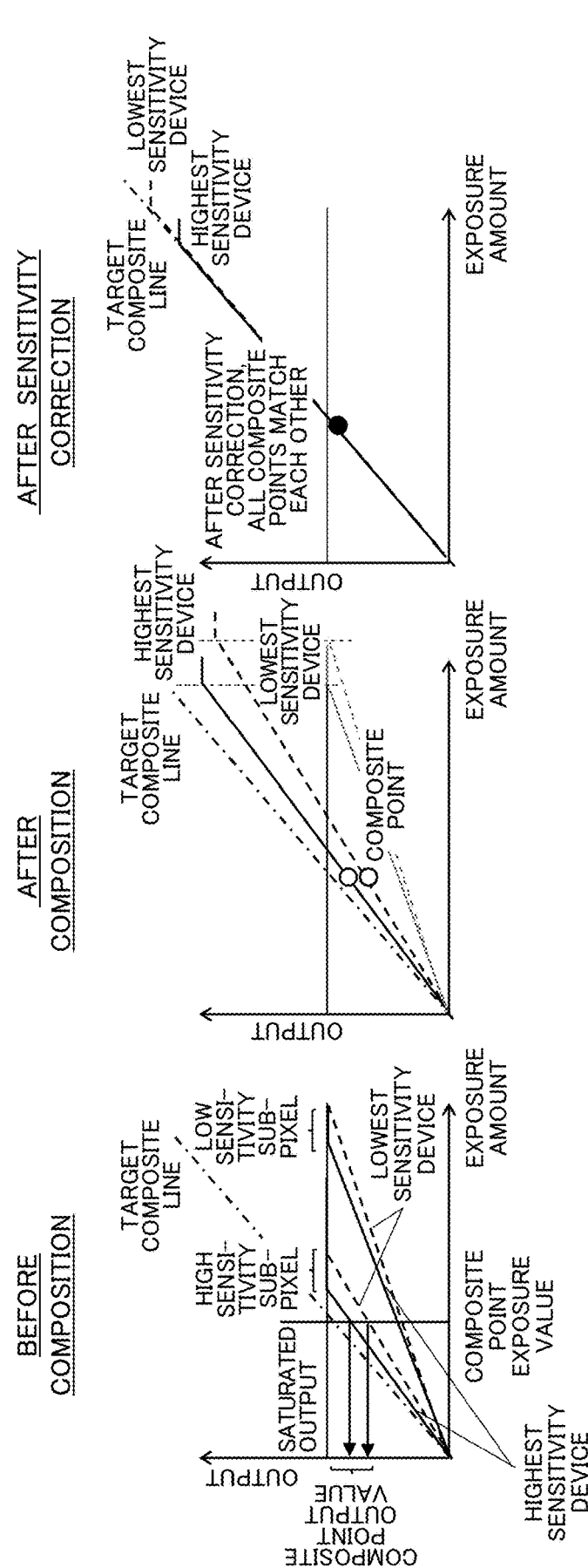
FIG. 7 includes graphs showing HDR composition and a sensitivity correction method by an imaging apparatus of a second embodiment.

The graphs of FIGS. 7(a) to 7(c) show states before composition of the high sensitivity and low sensitivity sub-pixel signals, after composition thereof, and after sensitivity correction, respectively. FIG. 7 illustrates a case where sensitivity characteristics of the imaging devices 11 used are not uniform, but vary from the lowest sensitivity to the highest sensitivity. In this embodiment, a sensitivity variation range of the imaging device 11 is estimated in advance, and a sensitivity characteristic of a high sensitivity sub-pixel 11a with the highest sensitivity or a sensitivity characteristic slightly higher than that is set as a target composite line for all cameras. Subsequently, composite-point exposure amount is determined so that the low sensitivity and high sensitivity sub-pixel composition is performed with the same exposure amount for all cameras.

As a result, as shown in FIG. 7(b) showing the state after composition, although the composite-point output values of all cameras are not the same, the sub-pixels are composed at the same exposure amount, and thus the composed output values appear with a difference corresponding to a difference in sensitivity. In contrast, as shown in FIG. 7(c), if a gain is applied for sensitivity correction so that the sensitivity characteristics of all cameras provide the target composite line, all the composite points can be adjusted to the same point.

Method for Registering Parameter in Register 40

Figure 8:
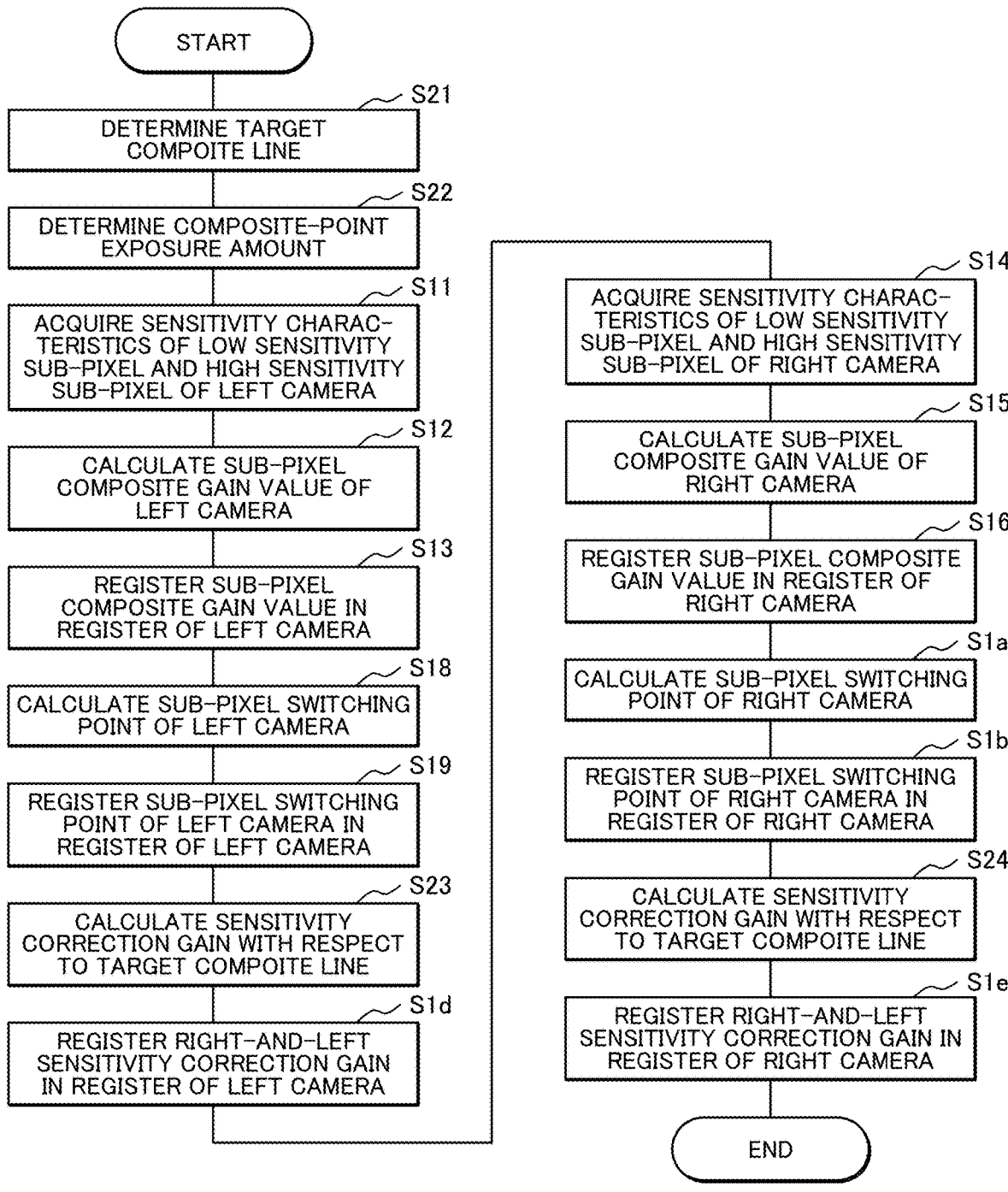
FIG. 8 is a flowchart of the HDR composition and sensitivity correction in the second embodiment.

A method for registering various parameters in the register 40 in this embodiment is now described with reference to a flowchart of FIG. 8. The operation subject of each step described below is a parameter registration operator or a parameter registration operation device.

First, in step S21, a target composite line is determined. The target composite line is a common target value for all cameras.

Subsequently, in step S22, the exposure amount at the composite point is determined. The composite-point exposure amount is also a common value for all cameras.

Steps S11 to S13 and S18 to S19 are the same as those in the first embodiment. As a result, the sub-pixel composite gain value and the sub-pixel switching point are registered in the register 40L of the left camera 1L.

In step S23, a correction gain is calculated to correct a sensitivity difference for the left camera 1L with respect to the target composite line determined in step S21. This operation may be performed after acquiring the sub-pixel sensitivity.

In step S1d, the correction gain calculated in step S23 is registered in the register 40L of the left camera 1L.

Steps S14 to S16 and S1a to S1b are the same as those in the first embodiment. As a result, the sub-pixel composite gain value and the sub-pixel switching point are registered in the register 40R of the right camera 1R.

In step S24, a correction gain is calculated to correct the sensitivity difference for the right camera 1R with respect to the target composite line determined in step S21. This operation may be performed after acquiring the sub-pixel sensitivity.

In step S1d, the correction gain calculated in step S24 is registered in the register 40R of the right camera 1R.

According to the imaging apparatus of this embodiment as described above, even if the sensitivity characteristics of the imaging devices 11 of the cameras vary from the lowest sensitivity to the highest sensitivity, the sensitivity characteristics of all cameras can be made the same without causing mismatch in composite point between the cameras, making it possible to achieve good parallax performance.

Third Embodiment

An imaging apparatus 100 according to a third embodiment of the invention is described below with reference to FIG. 9. Duplicated description of points common to the previous embodiments are omitted.

Figure 9:
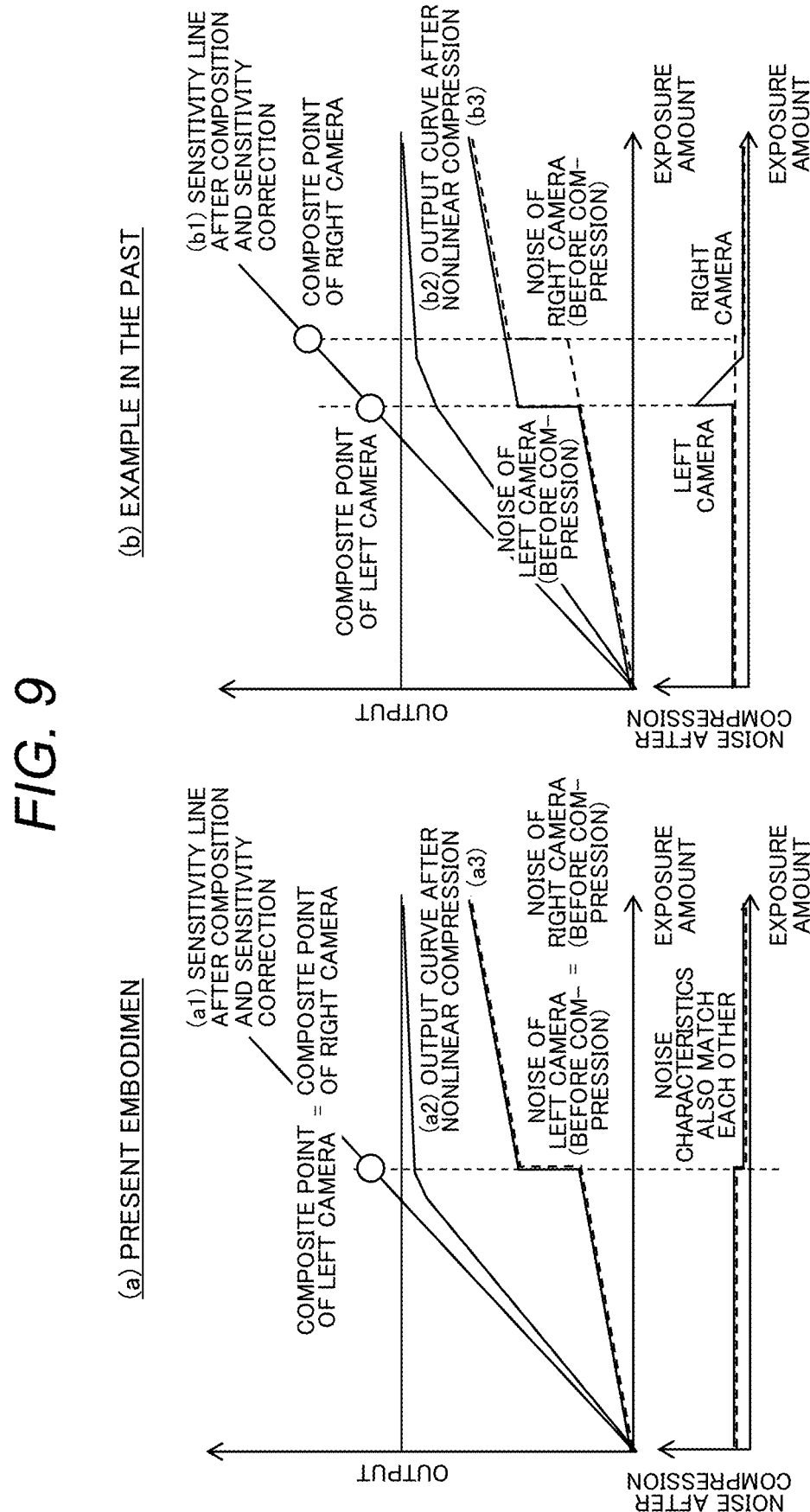
FIG. 9 includes graphs showing HDR composition and a sensitivity correction method by an imaging apparatus of a third embodiment.

The solid line (a1) in FIG. 9 shows the sensitivity line after the sensitivity correction in the first embodiment (see FIG. 4(c)), and the solid line (b1) in FIG. 9 shows the sensitivity line after the sensitivity correction in the example in the past (see FIG. 5(c)).

As shown in FIGS. 9(a) and 9(b), the maximum number of gradations of the HDR image signal after sub-pixel composition and right-and-left sensitivity correction is much larger than that of the original sub-pixel signal, which prevents image calculation from being performed at a desired processing speed or prevents an image from being displayed on a desired image display device. The output after the composition and sensitivity correction is therefore nonlinearly compressed in the signal compression section 15 to an appropriate maximum number of gradations, as shown by (a2) and (b2) in FIG. 9.

As described above, when the sub-pixels are composed, a large gain is applied to the low sensitivity sub-pixel 11b so that the low sensitivity and high sensitivity sub-pixels are placed on the same sensitivity line. As a result, the gain is also applied to noise in a region where the low sensitivity sub-pixel 11b is used, resulting in an increase in noise. As shown by (a3) and (b3) in FIG. 9, therefore, a noise characteristic increases abruptly after the composite point as a boundary.

In the example in the past, where the right and left cameras have different composite points, as shown in the lower graph of FIG. 9(b), noise characteristics also vary between the composite points of the right and left cameras. On the other hand, in this embodiment, as shown in the lower graph of FIG. 9(a), there is no interval between the composite points of the right and left cameras, and the noise characteristics of the right and left cameras match each other regardless of the exposure amount to allow the composite points of the right and left cameras to match each other after composition and sensitivity correction.

The nonlinear compression to reduce the maximum number of gradations has an effect of compressing noise, and such noise suppression effect is larger in a region with a higher compression rate of the compression curve. The noise compression effect is therefore determined by determining the compression curve. In this embodiment enabling the composite point to be constant, therefore, efficient noise suppression can be achieved by increasing a second compression rate in a region, in which the exposure amount is greater than at the composite point and noise is increased, than a first compression rate in a region in which the exposure amount is smaller than at the composite point and noise is not increased.

LIST OF REFERENCE SIGNS

100: imaging apparatus
1: camera
10: imaging unit
11: imaging device
11a: high sensitivity sub-pixel
11b: low sensitivity sub-pixel
12: gain amplifier
13: HDR composition section
14: gain amplifier
15: signal compression section
20: lens
30: geometric correction section
40: register
50: parallax image generating unit
51: stereo matching section
Sa: high sensitivity sub-pixel signal
Sb: low sensitivity sub-pixel signal

The invention claimed is:

1. A stereo camera apparatus comprising a plurality of cameras, including a first camera and a second camera, each first and second camera including:

an imaging device including unit pixels being periodically arranged, each unit pixel including a high sensitivity sub-pixel that outputs a first output value for a certain exposure amount, and a low sensitivity sub-pixel that outputs a second output value lower than the first output value for the certain exposure amount;

a composition section that selects and outputs an output of the high sensitivity sub-pixel when the exposure amount is smaller than a predetermined exposure value, and selects and outputs an output of the low sensitivity sub-pixel when exposure amount is larger than the predetermined exposure value; and an amplifier that amplifies the output of the composition section and outputs the amplified output, a register that receives and stores gain information used for amplifying the output of the composition section so that a sensitivity characteristic of the amplified output of the first camera matches a sensitivity characteristic of the amplified output of the second camera;

wherein the predetermined exposure value is identical between the plurality of cameras, and wherein, based on the gain information in the register, the amplifier corrects image signals from the high sensitivity sub-pixel and the low sensitivity sub-pixel to allow the image signals from the high sensitivity sub-pixel and the low sensitivity sub-pixel to be the same between the first camera and the second camera at least at the identical predetermined exposure value.

2. The stereo camera apparatus according to claim 1, wherein the gain information is set in the register based in part on determined sensitivity characteristics of the high sensitivity sub-pixel and the low sensitivity sub-pixel and a determined composite-point exposure amount so as to enable an output sensitivity characteristic of the composition section of the first camera to match an output sensitivity characteristic of the composition section of the second camera.

3. The stereo camera apparatus according to claim 1, wherein the gain is set in the register based in part on determined sensitivity characteristics of the high sensitivity sub-pixel and the low sensitivity sub-pixel and a determined composite-point exposure amount to allow an output sensitivity characteristic of the composition section of each of the first camera and the second camera to match a predetermined target characteristic.

4. The stereo camera apparatus according to claim 1, each camera further including a signal compression section that performs signal compression on the amplified output of the amplifier,
wherein the signal compression section performs signal compression at a first compression rate when the exposure amount is smaller than the predetermined exposure value, and performs signal compression at a second compression rate higher than the first compression rate when the exposure amount is larger than the predetermined exposure value.

5. The stereo camera apparatus according to claim 1, further including a parallax image generation unit that generates a parallax image using outputs of the plurality of cameras.

6. A stereo camera imaging method, the method using at least a first camera and a second camera of a stereo camera, each first and second camera including a register and unit pixels, each unit pixel including a plurality of types of sub-pixels having different output characteristics for an exposure amount,
the plurality of types of sub-pixels including a high sensitivity sub-pixel that outputs a first output value for a certain exposure amount, and a low sensitivity sub-pixel that outputs a second output value lower than the first output value for the certain exposure amount,
the method comprising, for each of the first camera and the second camera:
determining one of outputs from the high sensitivity sub-pixel and the low sensitivity sub-pixel as an output of the unit pixel for the certain exposure amount while switching between the output from the high sensitivity sub-pixel and the output from the low sensitivity sub-pixel before and after a predetermined exposure value,
storing, in the register, gain information to use for amplifying at least one of the outputs so that a sensitivity characteristic of the amplified output of the first camera matches a sensitivity characteristic of the amplified output of the second camera, and
composing an image signal from the high sensitivity sub-pixel and an image signal from the low sensitivity sub-pixel by amplifying at least a portion of the image signal based on the gain information stored in the register to allow the image signals from the high sensitivity sub-pixel and the low sensitivity sub-pixel to be the same between the first camera and the second camera at the predetermined exposure value, wherein the predetermined exposure value is identical between the first camera and the second camera.

7. The imaging method according to claim 6, further comprising:

setting the gain information in the register based in part on determined sensitivity characteristics of the high sensitivity sub-pixel and the low sensitivity sub-pixel and a determined composite-point exposure amount so as to enable an output sensitivity characteristic of the composition section of the first camera to match an output sensitivity characteristic of the composition section of the second camera.

8. The imaging method according to claim 6, further comprising:

setting the gain information in the register based in part on determined sensitivity characteristics of the high sensitivity sub-pixel and the low sensitivity sub-pixel and a determined composite-point exposure amount so as to allow an output characteristic of a composition output of each camera to match a predetermined target characteristic.

9. The imaging method according to claim 6, further comprising:

performing signal compression on an amplified output at a first compression rate when the exposure amount is smaller than the predetermined exposure value, and performing signal compression on the amplified output at a second compression rate, higher than the first compression rate, when the exposure amount is larger than the predetermined exposure value.

10. The imaging method according to claim 6, further comprising:

generating a parallax image using outputs of the first and second cameras.

* * * * *